June 11, 1968 M. F. WALKER 3,387,465

PHASE ADJUSTING COUPLING

Filed Aug. 8, 1966 2 Sheets-Sheet 1

INVENTOR.
MELVIN F. WALKER
BY
Leonard H. King
ATTORNEY

June 11, 1968  M. F. WALKER  3,387,465
PHASE ADJUSTING COUPLING
Filed Aug. 8, 1966  2 Sheets-Sheet 2
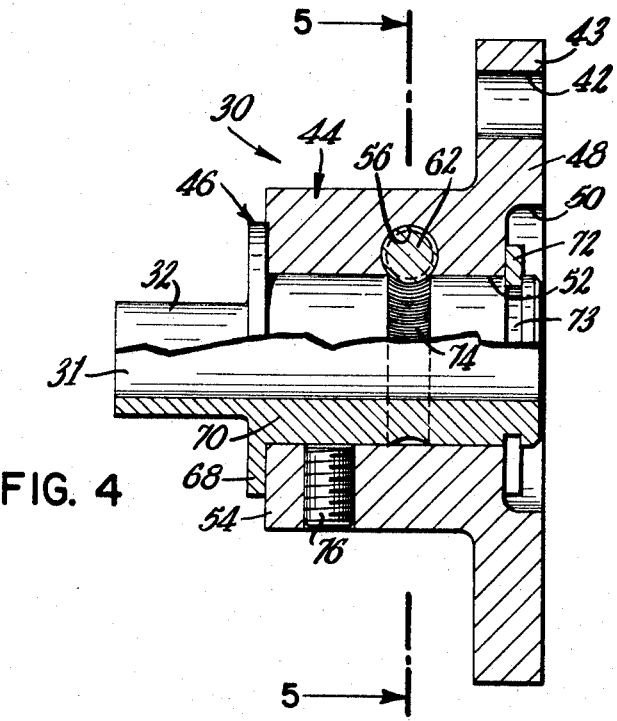
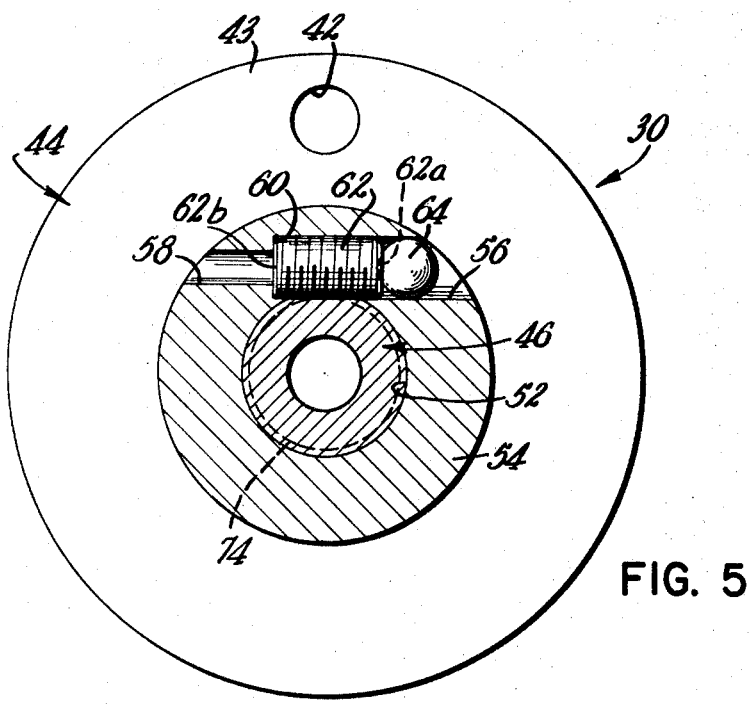
INVENTOR.
MELVIN F. WALKER
BY
*Leonard H. King*
ATTORNEY

United States Patent Office 3,387,465
Patented June 11, 1968

3,387,465
PHASE ADJUSTING COUPLING
Melvin F. Walker, Deer Park, N.Y., assignor to
Designatronics, Inc., Mineola, N.Y.
Filed Aug. 8, 1966, Ser. No. 570,843
4 Claims. (Cl. 64—24)

ABSTRACT OF THE DISCLOSURE

Coupling means for coupling two in-line shafts wherein means are provided for adjusting the phasing between the coupled shafts.

---

This invention relates generally to coupling means and more particularly to a coupling device having improved means for adjusting the phasing of two adjacent shafts or the like.

In order to achieve a high degree of precision when using certain rotating components, it is frequently necessary to accurately phase one of the shafts with respect to the other. Means for accomplishing this is described in U.S. Patent No. 3,024,629 granted on Mar. 13, 1962 to Nicholas M. Raskhodoff. Therein a worm screw and worm wheel combination is used to angularly reposition a hub to which is rigidly affixed a driving shaft. The hub, in turn, is mechanically coupled to a second hub that is rigidly secured to the driven shaft.

The present invention is particularly directed to an improvement in the type of phase changing device disclosed in the Raskhodoff patent. A concealed worm is used instead of a headed screw. The worm is disposed in the larger diameter of a transverse, counterbored hole in the outer hub of the assembly and is prevented from axial movement in one direction by a shoulder in the hole. The worm is prevented from axial movement in the opposite direction and is rotatably supported by a ball press fit into the counterbored hole. Access may be had to the adjusting end of the work through the smaller diameter of the counterbored hole.

In addition to providing means for positively retaining the worm, the present invention presents a clean uncluttered appearance at the hub. The external retaining ring and the screw head used by the prior art has been eliminated. Because of the ball bearing support adjustment of the work is smoother and, in addition, the device is inherently balanced, thus permitting high speed operation without undue vibration. A more rugged construction is attained and yet the device may be precisely adjusted.

Accordingly, an object of this invention is to provide an improved angularly adjustable phasing coupling.

Another object is to provide improved worm retaining means for an angularly adjustable phasing coupling.

Still another object is to provide a completely concealed worm drive means for an angularly adjustable phasing coupling.

A further object is to provide an improved phase adjusting coupling that is inherently balanced.

Yet another object is to provide an improved phase coupling including a ball bearing support for the adjusting means.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawing:

FIG. 4 is a longitudinal view partly in section of the present invention; and

FIG. 5 is a transverse sectional view taken along line 5—5 of FIG. 4.

Figure 1A:
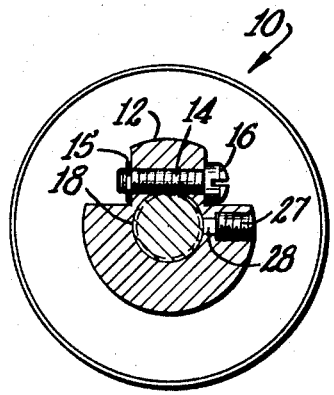
FIGS. 1A and 1B are transverse and longitudinal sectional views, respectively, of a prior art device.
Figure 1B:
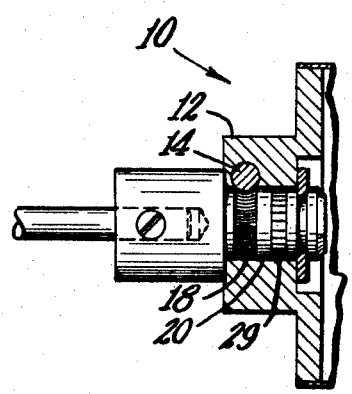

The prior art device 10 disclosed in U.S. Patent No. 3,024,629 is illustrated in FIGS. 1A and 1B and is seen to comprise an adjustment member 12 having a rotatable work screw 14 journalled therein. Retaining ring 15 and slotted head 16 prevent the worm from moving axially. A worm gear 18 that is integrally formed on a reduced diameter 20 of hub 22 is in meshing engagement with the worm. Once the angular position of the hub is determined, it is fixed by means of set screw 24. A driving shaft 26 is rigidly secured in hub 22 by means of a set screw 27. A nylon washer 28 is urged by the set screw against a serrated peripheral band 29 on the hub. The device may be coupled to utilization apparatus such as a coaxial shaft by several means, a bellows being shown in the aforementioned patent by way of example.

Figure 2:
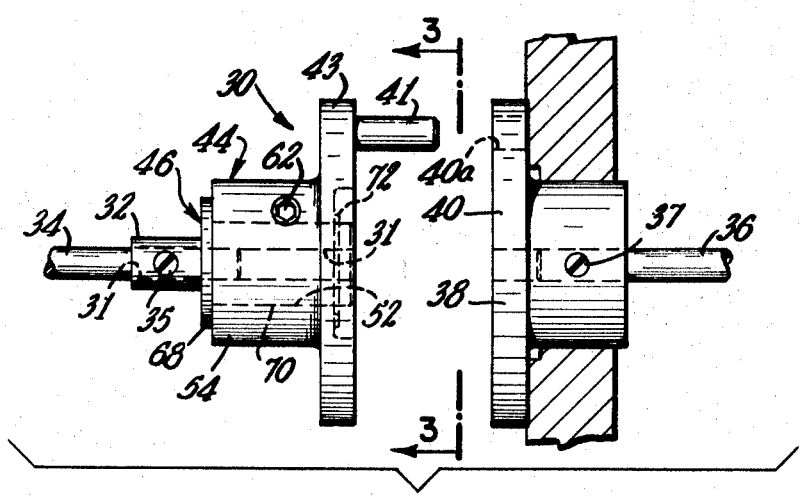
FIG. 2 is a side elevational view of the present invention showing the device coupled to a utilization device; the invention and utilization device being shown in exploded form.
Figure 3:
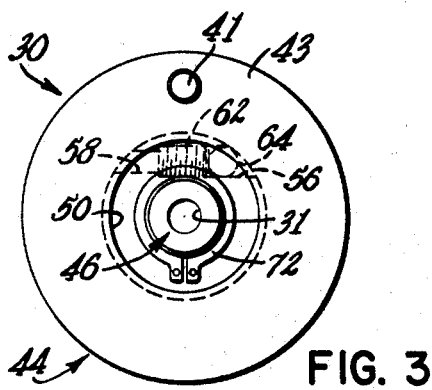
FIG. 3 is an end elevational view taken along line 3—3 of FIG. 2.

The structural features of this invention and the manner in which they distinguish over the prior art will now be explained. Referring now to FIG. 2, the phase adjusting coupling 30 includes a central bore 31 at one end 32 that is arranged to receive the driving shaft 34. Set screw 35 rigidly secures shaft 34 to end 32 of the coupling device. The driven shaft 36 is rigidly secured by means of set screw 27 to a hub 38 that is rotatable in a fixed support member 40. A drive pin 41, press fit into aperture 42 in flange 43, connects the adjustable coupling 30 to a socket 40a in the rotatably driven hub 38.

As shown in FIG. 4 and in FIG. 5, the coupling device is comprised of an outer hub 44 and an inner hub 46 coaxially disposed therein. Considering first the outer hub, it will be seen that the righthand end face 48 (FIG. 4) has a shallow centrally located recess 50 therein that is coaxial with a central longitudinal bore 52 arranged to receive the inner hub. The body portion 54 of the outer hub is also provided with a transverse counterbored hole having contiguous diameters 56 and 58 defining a transverse interface or shoulder 60 therebetween (FIG. 5).

A worm 62 having a spherical socket 62a at one end, is disposed in the larger diameter 56 with the driving end 62b abutting shoulder 60. Access may be had to end 62b through aperture 58 in order to angularly adjust the work. Ball 64 is press fit into aperture 56 after the worm has been placed therein and seats against the spherical socket at the end of the worm, opposite the adjusting end. Thus, the worm is effectively captured and prevented from axial movement, but is still able to be smoothly displaced angularly because of the ball bearing support. Axial loads imparted by the rotation of the worm are taken up by the ball bearing support, thereby permitting very precise adjustment of the shafts in relation to each other. It will also be seen in FIG. 4 that aperture 56 is at right angles to bore 52 and breaks through the wall of the bore. Therefore, a small portion of the worm threads extend into bore 52.

The inner hub 46 includes a transverse flange 68 which, in the assembled condition, seats against the lefthand transverse face (FIG. 4) of the outer hub. Body portion 70 of the inner hub is loosely disposed in central bore 52 of the outer hub, such that the opposite end of the inner hub is positioned in recess 50. A retaining ring 72 is contained in an annular groove 73 proximate the right-hand end of the inner hub to thereby prevent the inner hub from moving axially with respect to the outer hub. Worm gear 74 is formed integrally with the body of the inner hub and in the assembled condition is located in the same transverse plane as the axis of worm 62 for meshing engagement therewith.

Inner hub 66 may be angularly rotated by means of the worm and worm gear arrangement in order to accurately establish the correct position of driving shaft 34. By way of example, the ratio of the coupling wrench rotation to the rotation of the coupling device may be 40:1. Thus one complete rotation of the adjustment wrench varies the phase angle between the driving and driven shafts approximately 9°. Other ratios are of course available. After this is done, the inner and outer hubs may be rigidly affixed to each other by means of set screw 76 (FIG. 4). Thus, drive pin 42 is precisely positioned angularly with respect to driven shaft 36.

The invention described hereinabove provides simple yet very effective means for capturing the worm and preventing axial movement. The ball that is press fit into the counterbored hole in the outer hub completely conceals and rotatably contains the worm gear which is still available for rotation at its opposite end. Should it become necessary to disassemble the worm, this may be done by inserting a pin in the smaller diameter of the counterbored hole in the outer hub and applying a force to the pin. This will drive out both the worm and the ball. However, in the absence of any such substantial force, the ball will effectively hold in the worm. Since the ball abuts a spherical recess in one end of the worm, rotation of the worm by means of an Allen wrench or the like may be effected by even unskilled workers who have been given a minimum of training in the phasing technique. It will also be seen that because of the ball retaining means employed herein, the unit's design is inherently balanced so that it may be operated at high speed without undue vibration.

Having thus disclosed the best embodiment of the invention presently contemplated, it is to be understood that various changes and modifications may be made by those skilled in the art without departing from the spirit of the invention.

What is claimed is:

1. A coupling device for adjusting the phase angle between a driving and a driven member, said device comprising:
    (a) an outer hub adapted to be coupled to the driven member, said outer hub including first and second bores in communication with each other;
    (b) an inner hub rotatably disposed within the first bore of said outer hub; said inner hub being adapted to be secured to the driving member;
    (c) first gear means integral with the portion of said inner hub disposed in the first bore of said outer hub;
    (d) second gear means rotatably disposed within said second bore of said outer hub and angularly displaceable from a point external of said second hub, said first and said second gear being in meshing engagement with each other;
    (e) ball retaining means arranged to prevent axial movement of said second gear means, said ball retaining means being press fit into the second bore of said outer hub; and
    (f) means to lock and prevent angular movement of said first and second hubs with respect to each other.

2. The device in accordance with claim 1 wherein the second bore is transverse the first bore and the second bore is a counterbored hole defined by two different contiguous diameters and an interface therebetween, one end of said second gear being in abutment with said interface, the other end of said second gear being adjacent said retaining means.

3. The device in accordance with claim 1 wherein one end of said second gear is formed with a socket and said ball is disposed in said socket.

4. The device in accordance with claim 3 wherein said socket and said ball are spherical.

References Cited

UNITED STATES PATENTS

| 1,357,562 | 11/1920 | Hope | 308—166 |
| 1,493,999 | 5/1924 | Lombardi | 308—166 |
| 3,024,629 | 3/1962 | Raskhodoff | 64—24 |

FOREIGN PATENTS

| 208,875 | 1/1924 | Great Britain. |
| 322,656 | 12/1929 | Great Britain. |

HALL C. COE, *Primary Examiner.*